United States Patent Office 2,971,944
Patented Feb. 14, 1961

2,971,944
MALEIMIDE POLYMERS
Sui-Wu Chow, Montclair, and John M. Whelan, Jr., Murray Hill, N.J., assignors to Union Carbide Corporation, a corporation of New York
No Drawing. Filed Oct. 20, 1958, Ser. No. 768,094
9 Claims. (Cl. 260—78)

This invention relates to novel polymers produced from an N,N'-bis-maleimide and a thiophene dioxide. More particularly, this invention relates to tough, high temperature softening thermoplastic polymeric products made by the reaction of N,N'-bis-maleimide represented by the general formula

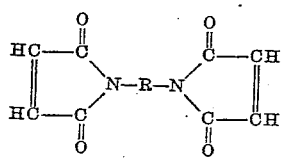

wherein R represents a divalent hydrocarbon group such as an alkylene, arylene, aralkylene, or alkarylene group with a thiophene dioxide represented by the general formula

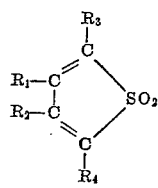

wherein $R_1$, $R_2$, $R_3$ and $R_4$ are hydrogen or monovalent organic radicals such as alkyl groups, aryl groups or hydrocarbon derivatives thereof, preferably having from 1 to 20 carbon atoms.

The reaction is accomplished by heating a mixture of the two monomers in a solvent, preferably in an inert halogenated hydrocarbon solvent, to an elevated temperature sufficient to initiate evolution of sulfur dioxide, and maintaining the reaction mixture at the elevated temperature until the polymerization is substantially complete. The reaction is best conducted at a temperature of between 150° C. and 160° C. At temperatures below about 80° C., polymerization reaction rate is too slow to be desirable. The mixture of these monomers polymerizes at a reasonable rate in the solvent upon heating to above about 150° C.

A noticeable evolution of sulfur dioxide accompanies the reaction. We believe that the two monomers first condense into a Diels-Alder adduct from which sulfur dioxide splits off, and the resultant compound then polymerizes to produce the final polymeric product. The reaction appears to go according to the following simplified scheme:

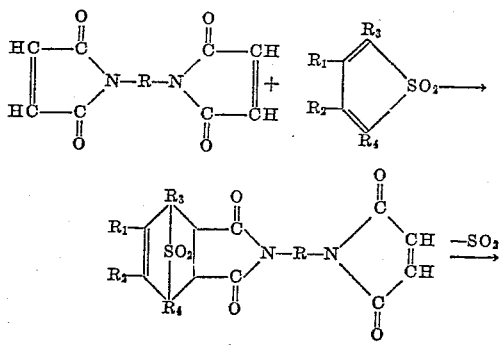

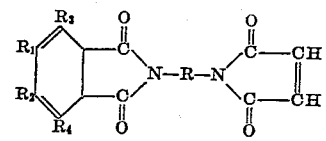

which then polymerizes into a polymer having the following structure:

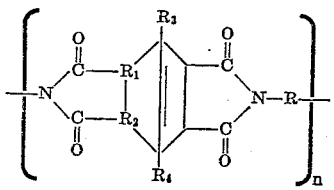

wherein n represents an integer such that the products will have a sufficiently high molecular weight to give the products a reduced viscosity of over 0.2 measured at 25° C. as a 0.200 gram sample in 100 ml. of dimethylformamide. Since the products are conveniently characterized by reduced viscosity methods, these measurements are preferred for indicating the degree of polymerization of the product. The most desirable thermoplastic polymers have reduced viscosities in excess of about 0.3. In order to achieve such viscosities the bis-maleimide and thiophene dioxides are employed in about equimolar amounts.

It is to be noted that this reaction scheme is shown for equimolar amounts of the monomers, which produces the highest molecular weight product. Products made employing a greater molar percent of one monomer have correspondingly reduced average molecular weight. The terminal groups of a polymer made with other than an equimolar ratio of reactants correspond to the monomer employed in the greater amount. Use of extremely disproportionate amounts of reactants produces only low molecular weight resins and is not to be desired.

The N,N'-bis-maleimides useful in this invention are conveniently prepared from maleic anhydride and a diamine in a manner such as described in U.S. Patent 2,444,536. This process basically consists in reaction of maleic anhydride and an appropriate diamine to yield a bis-maleamic acid according to the following scheme:

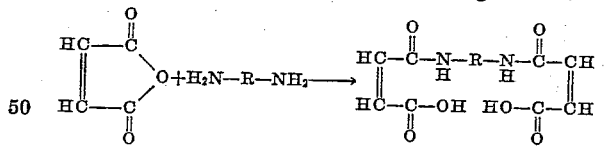

wherein R is a divalent hydrocarbon group, such as an alkylene, arylene, aralkylene, or alkarylene group or their substituted derivatives. The maleamic acid formed is then reacted with acetic anhydride and anhydrous potassium acetate to yield the desired N,N'-bis-maleimide, according to the following equation:

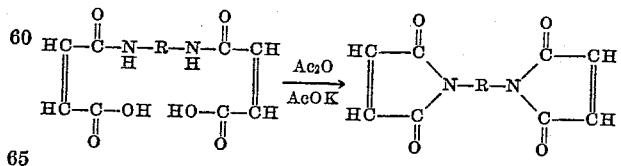

Bis-maleimides prepared in any other manner are likewise useful in this process.

The diamine employed in this preparation of the bis-maleimide determines the divalent radical connecting the maleimide groups, designated as R. Since the R group does not enter into the reaction it can be any group which is not labile or reactive with the maleimide or the thiophene dioxide under the reaction conditions. It can be any divalent hydrocarbon group, oxa-hydrocarbon group, halogen-hydrocarbon group, etc.

For example, R can be methylene, ethylene, propylene, butylene, hexamethylene, decamethylene, phenylene, biphenylene, tolylene, ditolylene, a xylylene group, a methylene bisphenylene group or alkyl substituted methylene bisphenylene group such as methylene bis(dimethyl phenylene) or oxy diethylene, oxy diphenylene, chloro hexamethylene, tetrachloroparaphenylene, and the like groups, or it may be a condensed divalent hydrocarbon group or an alkyl derivative thereof.

The thiophene dioxides employed in this invention can be prepared by oxidizing the appropriate thiophene with peracids. The 3,4-disubstituted thiophene dioxides are readily prepared in a manner such as described by Overberger, Mallon and Fine in J. Am. Chem. Soc., 72 4958 (1950).

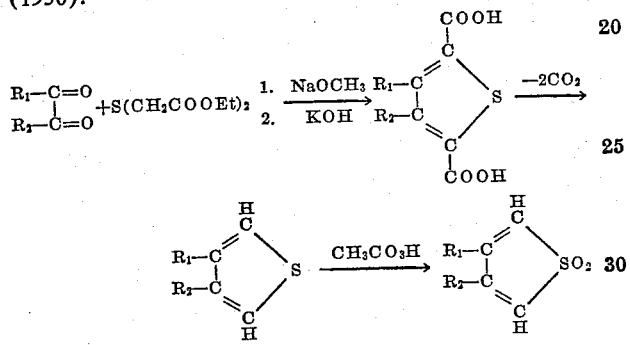

The preparation of 2,5-disubstituted thiophene dioxides is described by J. L. Melles and H. J. Backer in Rec. Trav. Chim. 42, 314 (1953).

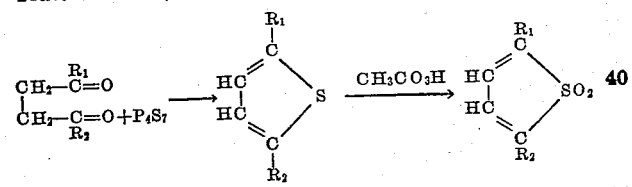

Since unsubstituted or unsymmetrically substituted thiophene dioxides are highly reactive and difficult to prepare, we prefer to employ symmetrically substituted thiophene dioxides such as 2,5-dimethyl; 3,4-diphenyl; 3,4-ditolyl; 3,4-dimethyl; 2,5-diphenyl thiophene dioxides, etc.

In this process, we have found it necessary to provide an amount of liquid reaction medium for carrying out the reaction. This is accomplished most conveniently by use of a solvent inert to both the monomers and the product and in which the monomers and polymer products are both soluble. Halogenated organic compounds, particularly chlorinated or brominated organic compounds having boiling points of above 80° C. have been found to be very efficient for this purpose and are preferred. Solvents such as 1,2 dichloroethane, bromobenzene, chloronaphthalene, chlorotoluene, bromotoluene, and the like are particularly desirable solvents. By dissolving the monomers in the solvent and heating to the refluxing temperature of the mixture, the reaction temperature can be easily controlled until the reaction is substantially complete or the desired product molecular weight is obtained. Reaction times of 15 min. to 24 hours can be used, depending on the reaction temperature chosen. In general, polymerization rate is much greater than degradation rate at any given temperature.

Extended reaction times can be employed without reducing the quantity or quality of the product provided the temperature is not so high as to cause degradation of the product.

Solvents having a boiling point below 80° C., as for instance, chloroform, can be employed where the pressure in the system is increased above atmospheric so that the reaction mixture preferably can be heated to about 150° C. Alternatively subatmospheric pressures can likewise be employed to lower the refluxing temperature of the reaction mixture.

It has been found necessary to provide a fluid reaction medium, but it is preferred that the solvent be employed in amounts as low as possible. Generally, the greater the monomer concentration in the solvent, the higher the reduced viscosity obtainable, and thus the greater the molecular weight of the resulting polymer. However, unless sufficient solvent is employed, the reaction mixture is difficult, if not impossible, to stir and to maintain at a uniform reaction temperature. Incomplete reaction or side reactions may then occur which result in a lower yield and lower molecular weight of the polymer. Thus the solvent content of the reaction mixture has a direct influence on the molecular weight of the polymer produced. In most applications, it is desired that the monomer content in the solvent be kept as high as possible, preferably in the range of about 15 to 35 parts by weight of monomer to 100 parts by weight of solvent.

Recovery of the polymer produced in this reaction is readily accomplished by precipitation of the polymer solution by addition to methanol followed by washing, filtering and drying. Yields of the polymer of about 95–100 percent are obtained. Precipitation methods for recovering the product are preferred although other methods for recovery can be used, for instance, stripping off the solvent under reduced pressures.

The products of this invention are hard, tough, thermoplastic polymers. These polymers have high softening points, generally at least 200° C. and more commonly above 300° C. The products produced from aromatic bis-maleimides generally have higher softening temperatures than do those from aliphatic bis-maleimides, and can range from 300° C. to 500° C. Melting points of typical polymers of this invention are shown below.

TABLE

| Thiopene Dioxide | Bis-maleimide | Solvent | Reflux Time | Reduced Viscosity | M.P., °C. |
|---|---|---|---|---|---|
| 3,4-Diphenyl | N,N'-(4,4'-Diphenylmethane) | s-tetra-chloroethane | 4 hrs | a 0.38 | 400 |
| Do | N,N'-Hexamethylene | do | 4 hrs | a 0.21 | 210 |
| 2,5-Dimethyl | N,N'-(4,4'-Diphenylmethane) | α chloro-naphthalene | 15 min | b 0.31 | 400 |
| Do | N,N'-Hexamethylene | do | 30 min | b 0.37 | 250 | a Reduced viscosity determined in dimethylformamide at 25°.
b Reduced viscosity determined in 3:2 phenol-s-tetrachloroethane.

The products of this invention are generally soluble in many halogenated solvents such as dichloroethane, tetrachloroethane, dichlorobenzene, dibromobenzene, chlorotoluene, bromotoluene, chloronaphthalene and bromonaphthalene and in dimethylformamide. The lower softening point polymers can be compression molded at temperatures of about 250° C. or cast into sheets or films from solution. The higher softening point polymers can also be cast from solution. The polymers are noncrystalline and nonorientable.

Other properties of these polymeric products are particularly interesting and suggest many specific applications. In addition to high softening points, the polymers have high strengths and advantageous electrical properties. Thin films of the polymers (1 to about 5 mils) have tensile strengths of 8–10,000 p.s.i. with a softening temperature often above 300° C. The polymers are likewise unaffected by dilute aqueous acids and bases and have a low degradation rate at temperatures below 200° C. Color formation and degradation, however, have been found to be caused by exposure to an oxidative atmosphere at elevated temperatures. Degradation at 250° C. is apparently the same phenomenon that occurs when the polymerization in the refluxing high boiling solvents is allowed to run too long and is presumably due to a reversal of the Diels-Alder reaction and subsequent reactions which change or destroy the end groups and prevent recombination. These side reactions which tend to prevent the formation of high molecular weight polymers also take place when the polymerization is run at too low a monomer concentration in the solvent.

Chemical stability tests on 4 mil films of the same polymer employed for the thermal stability tests showed them to be unaffected by 10 percent hydrochloric acid or 10 percent sodium hydroxide over a 24 hour period at room temperature. After this storage, there was no visible change in the films and no change in reduced viscosity of the resin. Other resins prepared within the limits of the invention herebefore set forth have equivalent thermal and chemical stability.

*Example 1*

0.008 mole of 3,4-diphenylthiophene dioxide and 0.008 mole of N,N'-(4,4'-diphenylmethane) - bis - maleimide (2.875 g.) were placed in 8 ml. of s-tetrachloroethane and were heated at reflux with stirring under an argon atmosphere for four hours. The thickened solution was poured into methanol and agitated in a Waring Blendor. The polymer weighed 3.6 g., corresponding to a yield of 80%, was tan and had a reduced viscosity of 0.38 in dimethylformamide at 25° C. Film cast from dimethylformamide had tensile moduli of 330,000 p.s.i. (25° C.), 130,000 (350° C.) tensile strength of 9,900 p.s.i.; and 13.6% elongation.

*Example 2*

0.0075 mole of 2,5-dimethylthiophene dioxide (1.070 g.), and 0.0075 mole of N,N'-(4,4'-diphenylmethane)-bis-maleimide (2.660 g.) were placed in 7.5 ml. of α-chloronaphthalene and were brought to reflux with stirring under argon atmosphere. Precipitate began to form at about 240° C. after ten minutes of heating. When the solution began to reflux after 15 minutes of heating the mixture was poured into methanol and agitated in a Waring Blendor. The polymer was tan in color and had a reduced viscosity of 0.37 in 3:2 phenol-s-tetrachloroethane at 25° C. Film cast from this mixture had tensile moduli of 250,000 p.s.i. (25° C.), 150,000 (350° C.); tensile strength of 8850 p.s.i.; and 9.2% elongation.

What is claimed is:

1. A normally solid thermoplastic polymer of an N,N'-bis-maleimide having the general formula

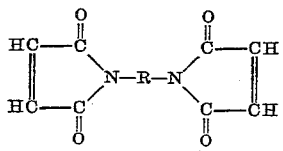

wherein R represents a divalent hydrocarbon group, and an approximately equimolar amount of a thiophene dioxide having the general formula

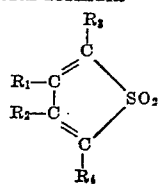

wherein $R_1$, $R_2$, $R_3$ and $R_4$ are members selected from the group consisting of hydrogen and monovalent hydrocarbon radicals reacted at a temperature above 80° C.

2. A normally solid thermoplastic polymer of an N,N'-bis-maleimide having the general formula

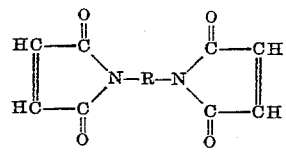

wherein R is a divalent hydrocarbon group, and an approximately equimolar amount of a thiophene dioxide having the general formula

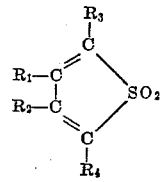

wherein $R_1$, $R_2$, $R_3$ and $R_4$ are members selected from the group consisting of hydrogen and monovalent hydrocarbon radicals reacted at a temperature above about 80° C., said polymer having a reduced viscosity at 25° C. of above about 0.2 measured as a 0.2 gram sample in 100 ml. of a solvent selected from the group consisting of dimethylformamide and 3:2 phenol:s-tetrachloroethane.

3. A process for preparing a thermoplastic polymeric product which comprises heating in the presence of an inert solvent for the reactants and products to provide a liquid reaction medium, and N,N'-bis-maleimide having the general formula

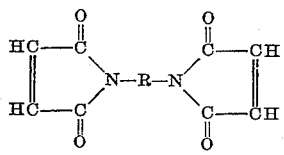

wherein R is a divalent hydrocarbon, and an approximately equimolar amount of a thiophene dioxide having the general formula

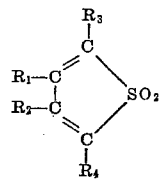

wherein $R_1$, $R_2$, $R_3$ and $R_4$ are members selected from the group consisting of hydrogen and monovalent hydrocarbon radicals to a temperature above about 80° C. and sufficient to initiate the evolution of sulfur dioxide.

4. A process for preparing a thermoplastic polymeric product which comprises heating in the presence of sufficient inert halogenated hydrocarbon solvent to provide a liquid reaction medium, an about equimolar mixture of an N,N'-bis-maleimide having the general formula

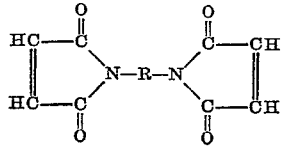

wherein R is a divalent hydrocarbon, and a thiophene dioxide having the general formula

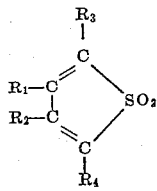

wherein $R_1$, $R_2$, $R_3$ and $R_4$ are members selected from the group consisting of hydrogen and monovalent hydrocarbon radicals to a temperature above about 80° C. and sufficient to initiate the evolution of sulfur dioxide and recovering the polymer thus produced.

5. A process according to claim 3 wherein said solvent is present in amounts of about 100 parts by weight per 15 to 35 parts by weight of monomer.

6. A solid thermoplastic polymeric heat reaction product of a N,N'-bis-maleimide having the general formula

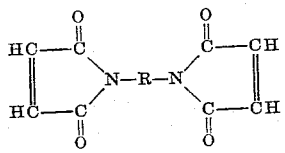

wherein R is a divalent radical selected from the group consisting of alkylene, arylene, aralkylene and alkarylene radicals, and an approximately equimolar amount of 2,5 dimethylthiophene dioxide reacted at a temperature above about 80° C., said product having a reduced viscosity above about 0.2 measured at 25° C. as a 0.2 gram sample in 100 milliliters of 3:2 phenol:s-tetrachloroethane.

7. A solid thermoplastic polymeric heat reaction product of a N,N'-bis-maleimide having the general formula

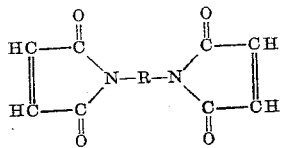

wherein R is a divalent radical selected from the group consisting of alkylene, arylene, aralkylene and alkarylene radicals, and an approximately equimolar amount of 3,4 diphenylthiophene dioxide reacted at a temperature above about 80° C., said product having a reduced viscosity above about 0.2 measured at 25° C. as a 0.2 gram sample in 100 milliliters of dimethylformamide.

8. A process for preparing a thermoplastic polymeric product which comprises heating in a liquid inert solvent reaction medium, an N,N'-bis-maleimide having the general formula

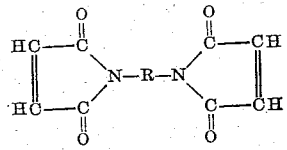

wherein R is a divalent hydrocarbon radical selected from the group consisting of alkylene, arylene, aralkylene and alkarylene radicals with a thiophene dioxide selected from the group consisting of 2,5 dimethylthiophene dioxide and 3,4 diphenylthiophene dioxide present in about equimolar amounts to reflux temperature and recovering the polymer produced.

9. A process for preparing a thermoplastic polymeric product which comprises heating in a liquid inert medium comprising a solvent for the reactants and the product an N,N'-bis-maleimide having the general formula

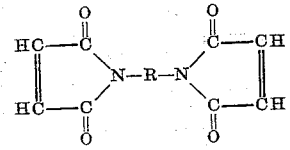

wherein R is a divalent radical selected from the group consisting of alkylene, arylene, aralkylene and alkarylene radicals and a thiophene dioxide selected from the group consisting of 2,5 alkyl substituted, 2,5 aryl substituted, 3,4-alkyl substituted and 3,4-aryl substituted thiophene dioxides present in about equimolar amounts to reflux temperature and recovering the polymer produced.

No references cited.

UNITED STATES PATENT OFFICE
CERTIFICATION OF CORRECTION

Patent No. 2,971,944 February 14, 1961

Sui-Wu Chow et al.

It is hereby certified that error appears in the above numbered patent requiring correction and that the said Letters Patent should read as corrected below.

Column 2, lines 10 to 17, the formula should appear as shown below instead of as in the patent:

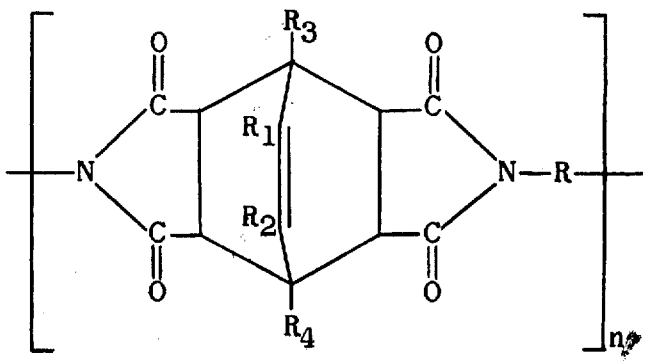

column 6, line 38, for "and" read -- an --.

Signed and sealed this 8th day of August 1961.

(SEAL)
Attest:

ERNEST W. SWIDER
Attesting Officer

DAVID L. LADD
Commissioner of Patents

Attest: